Figure 1:
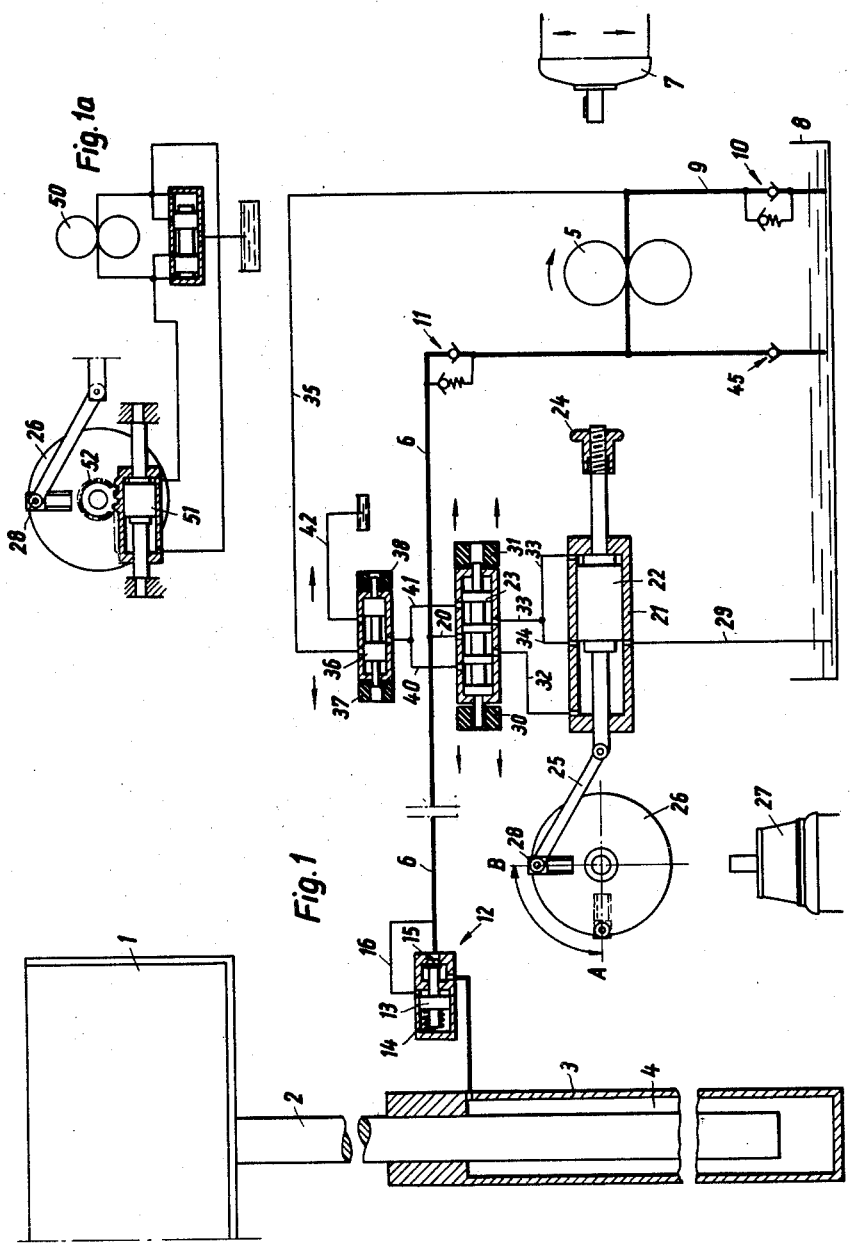

Sept. 29, 1964　　F. WEGERDT ETAL　　3,150,490
HYDRAULIC TRANSMISSIONS

Filed Aug. 24, 1962　　　　　　　　7 Sheets-Sheet 1

Inventor:

Inventor:

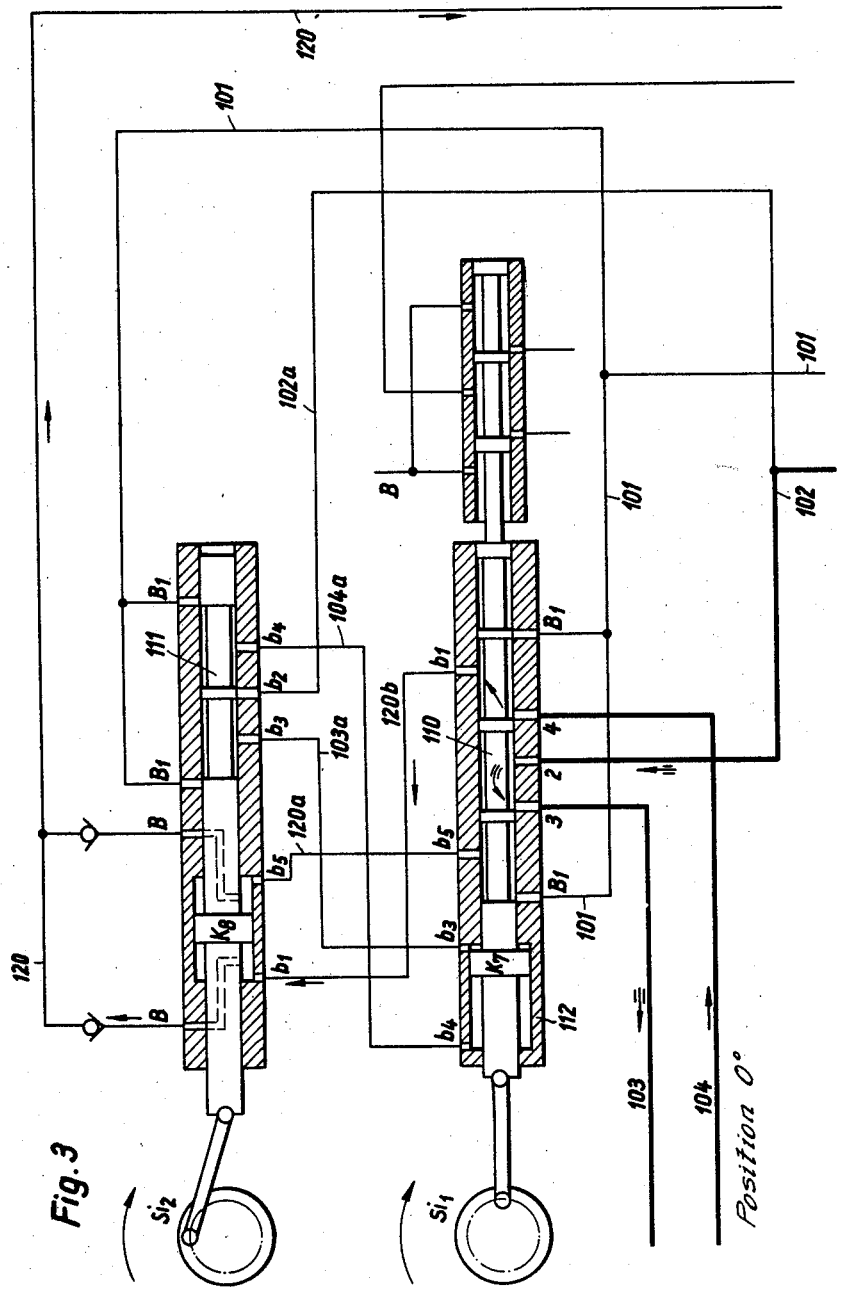

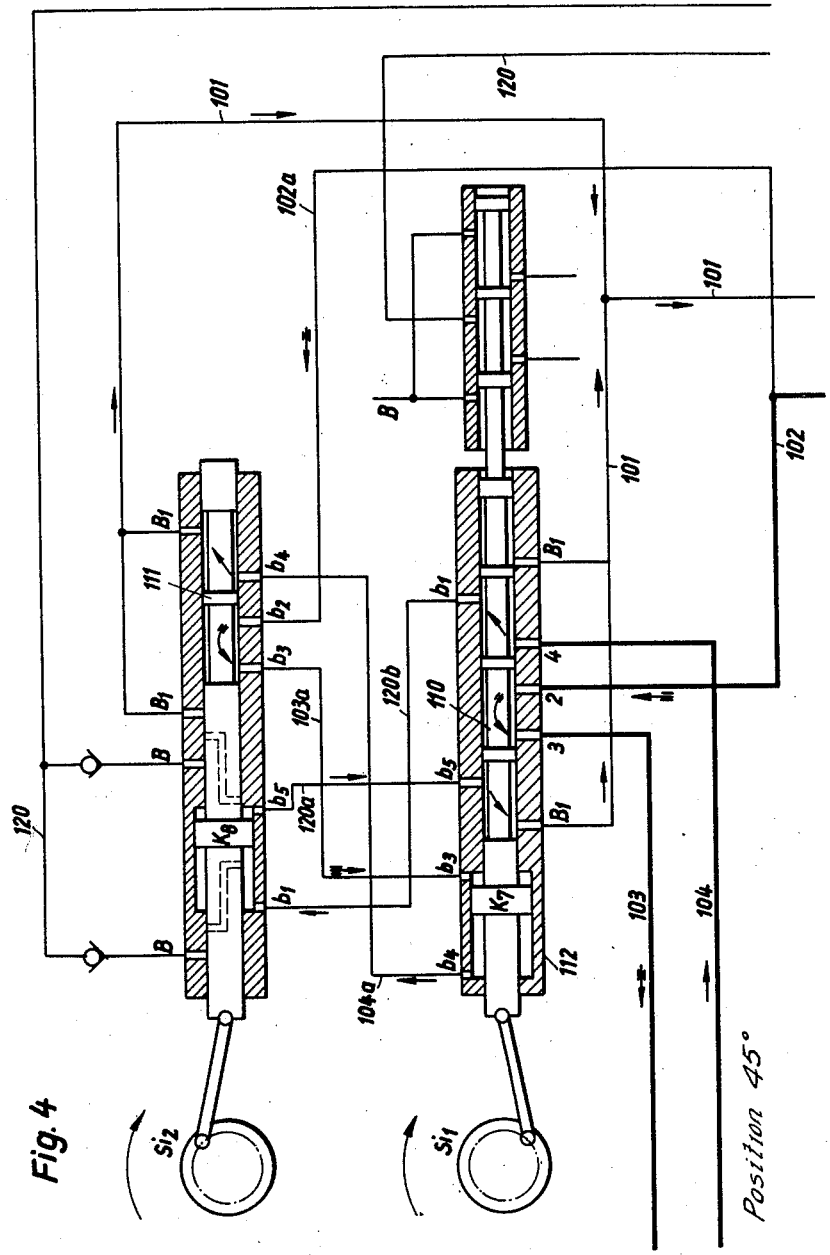

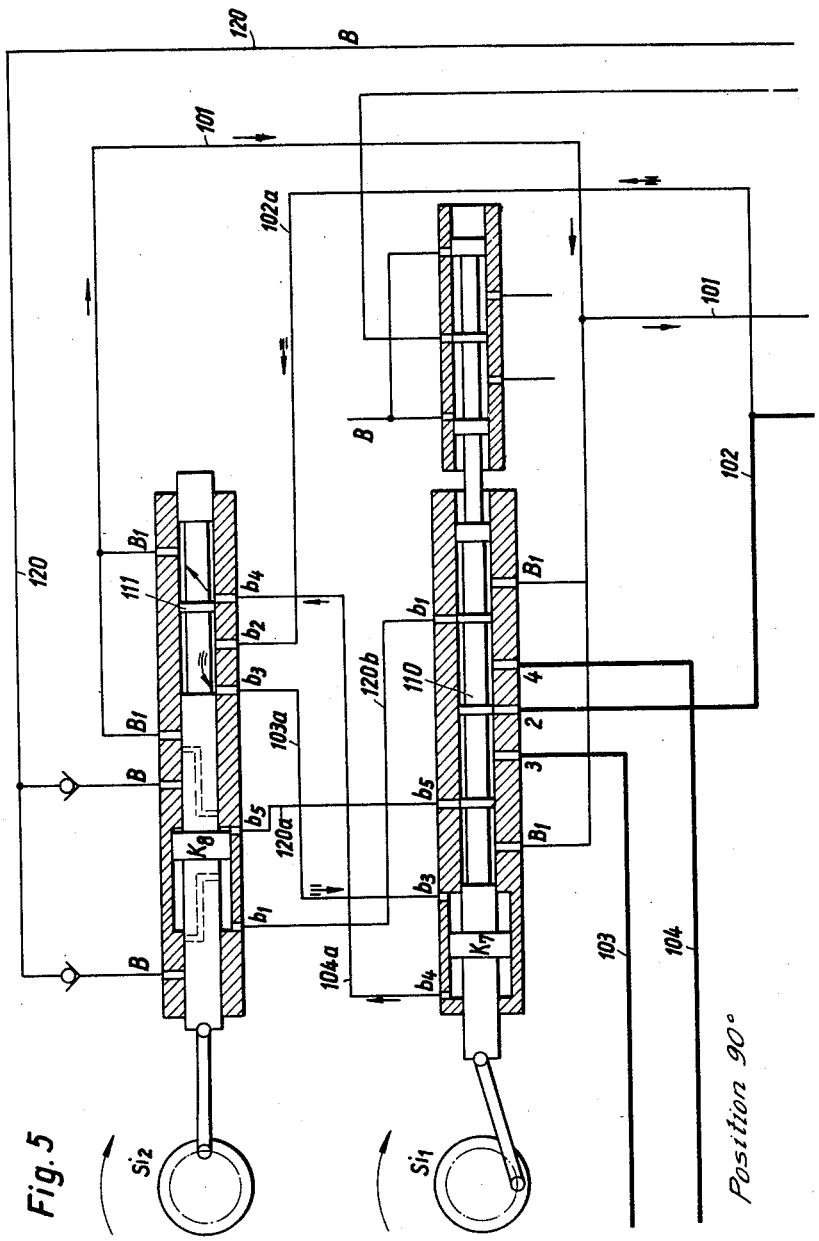

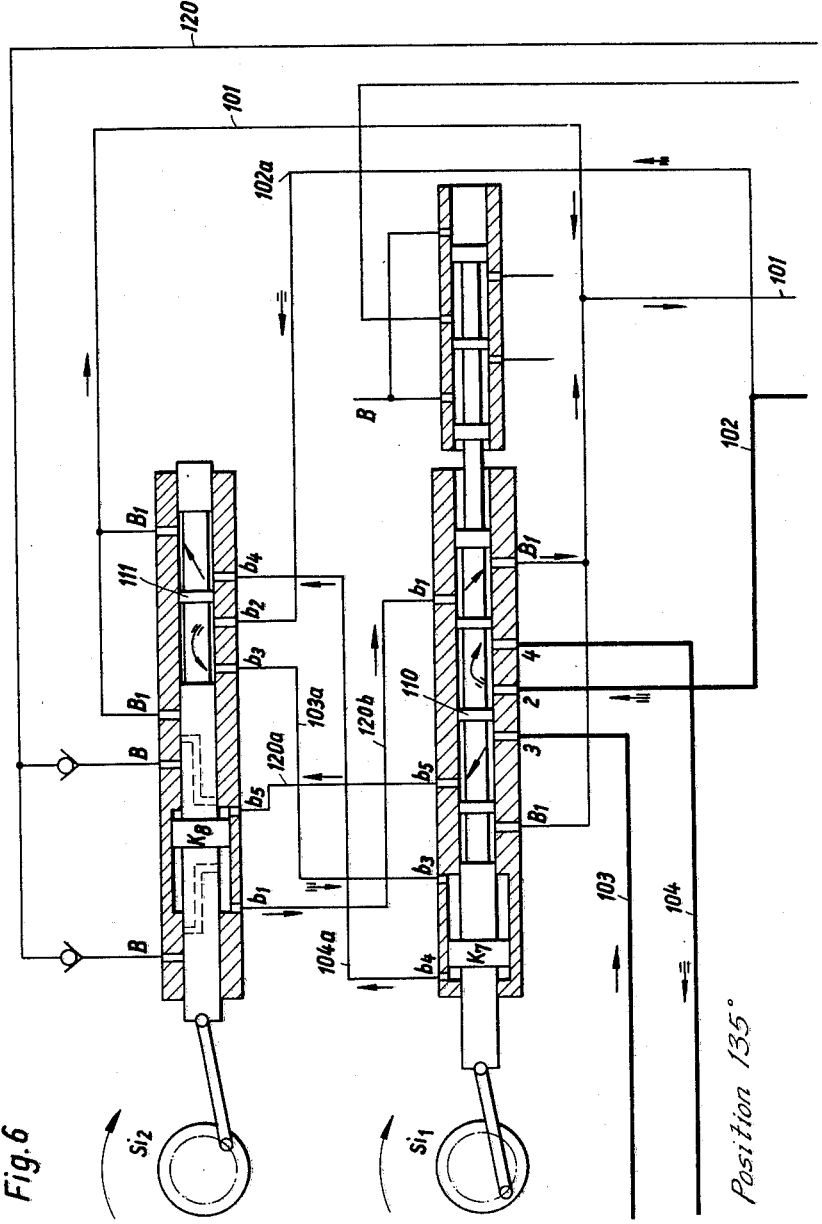

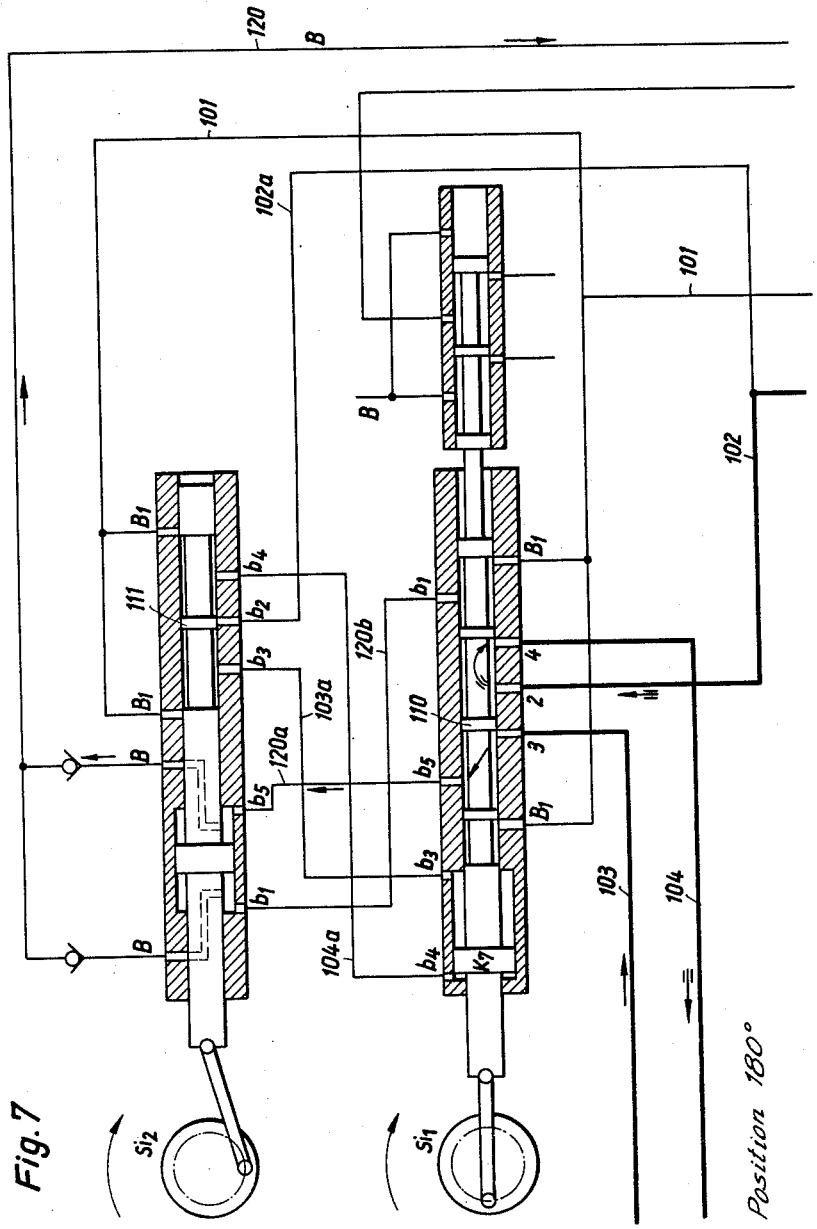

United States Patent Office 3,150,490
Patented Sept. 29, 1964

3,150,490
HYDRAULIC TRANSMISSIONS
Fritz Wegerdt and Martin Weber, Weingarten, Wurttemberg, Germany, assignors to Hydrel A.G., Romanshorn, Switzerland
Filed Aug. 24, 1962, Ser. No. 219,251
Claims priority, application Germany Aug. 26, 1961
20 Claims. (Cl. 60—52)

The invention relates to hydraulic transmissions, and particularly to means for smoothly decelerating and accelerating the same.

The above transmissions usually comprise a hydraulic motor, for example, a rotary piston, a double-acting piston carrying out a linear movement, or a plunger affected only on one side, as well as a hydraulic oil pump and a valve between the pump and motor for controlling the flow of oil to the motor or the flow of oil from the motor to the pump or to a tank. In many cases, such hydraulic transmissions must operate in such a way that the motor or a part moved thereby is stopped at predetermined points of the travel, and is accelerated from such point in one or the other direction. For example, this is the case with hydraulic lifts, substantially all machine tools carrying out linear movements, self-actors, or the like.

In principle, the braking to stop and the reacceleration may be effected by means of a valve which slowly throttles the hydraulic oil flow, and then again slowly increases the same. However, these valves are affected by the full working pressure and do not, in many cases, allow the satisfactory, smooth and sufficiently quick deceleration and acceleration.

On the other hand, it is known to control the hydraulic flow by means of the pump, per se. To accomplish this end, there are known, e.g., cell-type pumps or hydrostatic pumps, the volumetric output of which may be steplessly controlled from a maximum value on one direction through a zero value to a maximum value in the other direction. For many applications, especially for controlling linear, alternating movements, these pumps have proved very successful. However, the use of these pumps is subject to various limitations, which may be due to several reasons, as explained with reference to the following examples.

Hydraulic lifts use usually a plunger as a motor. A hydrostatic pump is unsuitable for this purpose, because it operates reasonably only with high oil pressures and such is undesirable in view of the mechanical stability of the comparatively long plunger and in addition, for this application, the pump is usually too noisy. For this reason, the stopping and starting of hydraulic lifts is controlled by valves which have the disadvantage of not producing a smooth transition in the speed control, and operating as a function of the pressure, that is, of the load. Thus, to obtain the precise stopping of the lift at the floor level, a slow movement is necessary which is then suddenly brought to a halt when the lift is in the correct position.

Another case in which the deceleration of a hydraulic transmission to zero and its subsequent acceleration is difficult, comprises hydraulic transmissions for high-frequency alternating movements. Some applications, such as gear cutters require a frequency of up to 1000 changes per minute or even more. The control of the alternations is difficult because the exact reversing points must always be at the same point of the movement and should be independent of the instantaneous operating speed. Throttle valves are much too slow for this purpose, and reversible hydraulic pumps are limited in application. This may be easily explained by considering that during the reversal, pressure must be equalized through zero in the cells or cylinders. To produce a complete pressure balance, always about half a revolution of the pump is necessary so that the operating frequency of the pump is limited by its speed.

The present invention is based on the concept that these decelerating and accelerating problems in hydraulic transmissions may be solved by adopting another method for decelerating and accelerating, and the invention has as an object means for the smooth deceleration and acceleration of hydraulic transmissions, adaptable universally to widely varying applications, and enabling the accurate, smooth operation of a certain stopping point without the restriction of temporal limits, or without requiring special preliminary actions, such as a slow movement, throttling the oil flow, and the like.

According to the invention, this object is achieved by a dosing cylinder with variable capacity, communicating with the oil flow between the pump and motor and having control means effecting during every deceleration and acceleration, a change in the storage capacity between zero value and maximum value, at which the volumetric change of the dosing cylinder per unit of time is substantially equal to the volumetric output of the pump, and is changed according to a predetermined curve. The flow of oil is produced by a pump with possibly adjustable, constant, volumetric output and with constant direction of rotation, and the control device for the dosing cylinder is preferably a sine-shaped drive, actuable at constant speed.

With this new arrangement, a hydraulic transmission is decelerated and accelerated without interrupting or throttling the connection between the motor and pump. Predetermined quantities of oil are removed from or supplied to the flow between the pump and motor. The amount of oil added to or removed from the flow per unit of time changes is according to a predetermined characteristic, and preferably a sine-shaped curve. This means that the amount of oil removed from, or added to, the connection per unit of time changes during the deceleration or acceleration between zero value and the maximum value, corresponds substantially to the volumetric output of the pump.

Assuming that the hydraulic motor communicates during its working stroke with the delivery side of the pump, for a deceleration hydraulic oil is bled from the flow to the motor by means of the dosing cylinder in the form of a branched-off current, which is first small, then rises according to the shape of the sine until it comprises the entire flow of oil delivered by the pump. At this moment, the hydraulic transmission is at a standstill. Since the temporal curve and the characteristic in the change of the storage volume is given by the control device, the control is effected always in the same smooth manner. If the hydraulic transmission is to remain in the stop position, the pump may be switched off as soon as the maximum value of the dosing cylinder volume change has been reached. If the direction of travel of the motor is to be reversed, a reversing valve may be actuated as soon as the maximum value of the volume change has been reached. Hence, the switching of the reversing valve occurs without high pressure on the delivery line, which switching does not present any difficulties.

It is also clear that this new arrangement makes possible very quick alternating movements for the smooth deceleration and acceleration with practically unlimited frequencies, and independent of the pump speed. On the other hand, it is obvious that, for example, in hydraulic lifts, an accurate smooth run-in to the stop may be obtained without requiring a slow movement. Also, this new arrangement is suitable particularly for low pressure pumps, such as are desirable for hydraulic lifts.

Further objects and advantages of the invention will become more readily apparent from the following detailed description.

Figure 2:
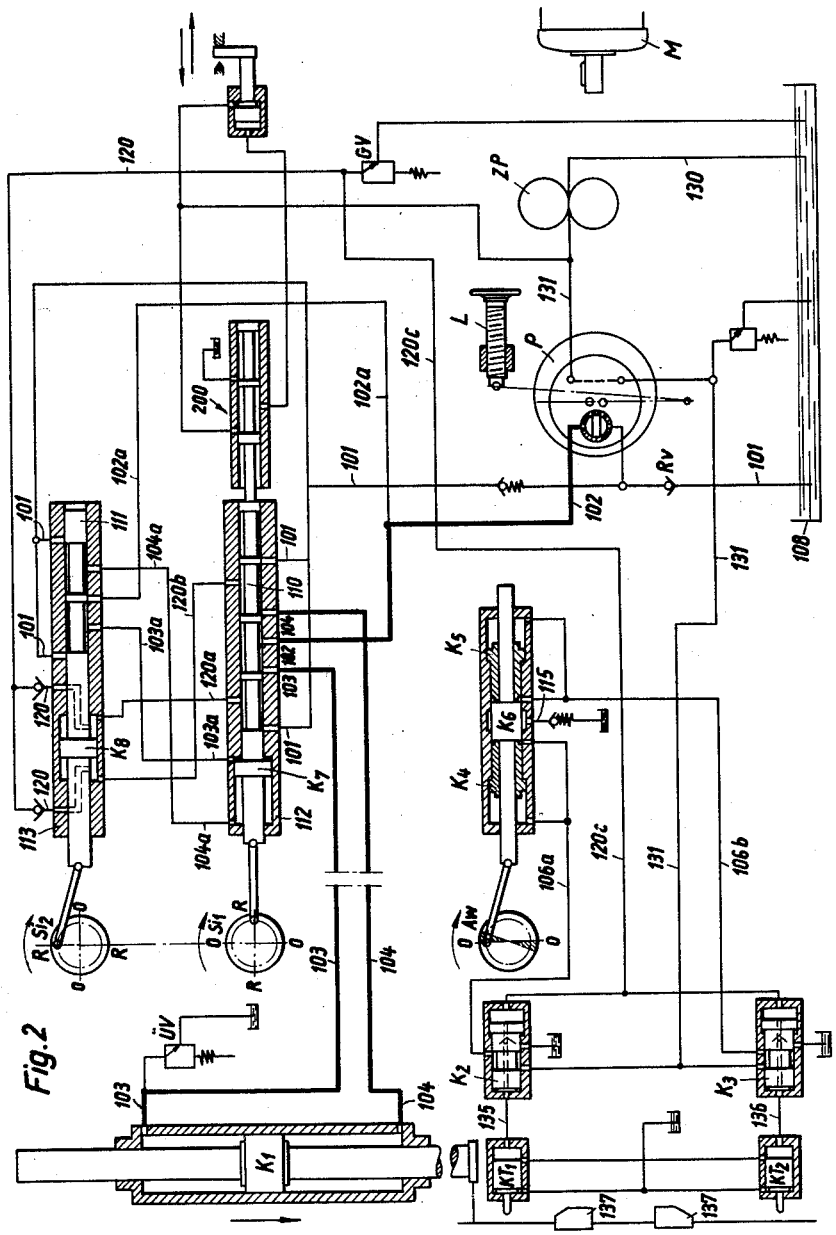

The invention will be further described, by way of example, with reference to the accompanying diagrammatic drawings, showing several embodiments, and in which:

FIG. 1 is a diagrammatic view of an arrangement applied to a hydraulic lift employing a hydraulic plunger as the working motor, FIG. 1a is a diagrammatic view of a modified drive arrangement, FIG. 2 is a diagrammatic view of an arrangement applied to a hydraulic transmission for alternating movements, particularly high-frequency machine tools, FIGS. 3 to 7 are diagrammatic views of a part of the arrangement of FIG. 2 in different working phases.

FIG. 1 shows the application of the invention to a hydraulic lift, in which a lift cage is shown diagrammatically at 1. The weight of the lift cage is borne by a rod or shaft 2 which defines the plunger of a hydraulic motor 3. Cylinder 4 of the motor 3 communicates with pump 5 through a duct 6. In this embodiment, the pump is a gear pump, driven in both directions by a motor 7, but other types of hydraulic pumps may be used. The pump 5 is connected with an oil reservoir or supply source 8 through a first suction duct 9, including a valve arrangement 10, whereby the pressure in the duct is always kept at slightly above zero pressure. A similar valve assembly 11 is located in the duct 6 between the hydraulic motor and the pump and also maintains a slight overpressure when this duct is connected to the suction side of the pump. Furthermore, in the duct 6 there is a valve assembly 12 in which piston 13 is actuated by spring 14 for biasing valve body 15 towards the closed position.

The other side of the piston 13 communicates through a branch conduit 16 with the duct 6 so that the piston may be moved in the opening direction if the duct 6 is under a sufficient pressure.

The duct 6 communicates through a branch duct 20 with a dosing cylinder 21 provided with a dosing piston 22, via a preliminary control valve 23 by means of which control valve the two ends of the piston 22 may communicate selectively with the branch duct 20. The dosing piston 22 projects from both ends of the cylinder 21 and includes at the right projecting end a stop 24, and at the left projecting end a link 25 for a sine-shaped drive 26. The sinusoidal drive is defined as a crank, in which the junction or connection 28 between the link 25 and the crank is adjustable. The crank drive 26 is driven by a servo motor 27 which may be switched on and off together with the motor 7 of the gear pump 5. The crank drive 26 may be driven by the motor 27 in either direction at a uniform speed so that the connection 28 between the link 25 moves through 90° between the positions A and B.

The preliminary control valve 23 may be adjusted in both directions by an electromagnet with such magnets being shown at 30 and 31. From the control valve 23, a connecting duct 32 leads to the left end of the dosing cylinder 21 and duct 33 to the right end of the cylinder. From duct 33 there branches off a conduit 34, communicating substantially with the center of the cylinder 21 so that its inlet is just opened by the piston 22 in its extreme right-hand position. At the same level as conduit 34, a duct 29 leads from the dosing cylinder to the reservoir 8. A conduit 35 located between the right side of the pump 5 and the preliminary control valve 23, contains a reversing valve 36, reversible into two positions by magnets 37 and 38. The valve 36 communicates with the control valve 23 through two branch ducts 40 and 41 and duct 42 leads from the reversing valve 36 to a tank or reservoir.

The operation of the arrangement of FIG. 1 is as follows:

The constant delivery pump 5 may be driven in either direction for lifting or lowering the cage 1. During the lifting of the cage, the pump aspirates through a non-return valve of the valve arrangement 10 via duct 9 and delivers oil into the duct 6 through the valve assembly 11. The oil opens the valve 12 so that oil may enter the cylinder 4 and lift the rod or shaft 2.

The cage 1, the track in the lift shaft, and the individual stops, are equipped with control feelers or switches, by means of which the travel or the stopping of the car may be controlled automatically or manually. If the cage 1 travels upwardly and the order "STOP" is given, the preliminary control valve 23 moves into the FIG. 1 position. The reversing valve 36 during the upward travel of the car is also in the FIG. 1 position. Simultaneously with the order "STOP," the sinusoidal drive 26 is operated. During the upward travel of the cage 1, the connecting point 28 of the drive 26 is in the position A. If the drive is now actuated, it rotates at constant speed from the position A to the position B, thereby causing the dosing piston 22 to move from its left-hand position in FIG. 1 to the right-hand position. During this movement, the left side of the piston 22 communicates through ducts 20 and 32 with the duct 6 between pump 5 and hydraulic motor 3. During the movement of the piston 22, the piston taps, in sine-shaped progression, oil from the pressure duct 6. The sinusoidal drive and the dosing cylinder 21 are so designed that with the connection 28 in position B, the piston 22 taps the entire delivery quantity of the pump 5 from the duct 6. When the piston reaches its right-hand position, it opens the conduit 34 and the duct 29 to the reservoir 8, and depressurizes the duct 6. Consequently, the valve assembly 12 closes automatically, thereby stopping the cage 1. Simultaneously, the drive 26 is switched off, and the cage comes to a stop from normal traveling speed without any jerking action.

The pump 5 may continue to run, delivering oil through ducts 20, 32, or 33, 34 and 29 into the reservoir 8. With subsequent actuation of the cage 1, the sinusoidal drive 26 is moved from position B into position A at uniform angular velocity, regardless of whether the cage is travelling up or down. Assuming that the next trip is upward, actuation of the lift moves the control valve 23 into its right-hand position, while the reversing valve 36 remains in the position shown. By reversing the preliminary control valve 23 into the right-hand position, duct 33 communicates with duct 20 while duct 32 communicates through ducts 40 and 42 with the reservoir causing oil to be discharged from the left side of the dosing piston 22. After a slight initial movement of the piston 22, ducts 34 and 29 are blocked, causing the piston 22 to tap on the right side predetermined amounts of oil from the duct 6, first according to the movement of the sinusoidal drive the entire quantity delivered by the pump. The tapped amount is reduced according to a sine curve until it reaches zero value when the connection 28 reaches position A, and in this position the motor 27 is switched off. Immediately at the beginning of this acceleration, the valve 12 has opened under the rising pressure in the duct 6, allowing oil to enter the cylinder 4. Thus, the cage 1 is accelerated without jerking movement from zero velocity to its usual travelling speed. The same cycle is repeated for the next stop.

If the cage is to descend from the stop position, simultaneously with the travelling order, the reversing valve 36 is moved into the left position, the preliminary control valve is moved into the left position, and the motor 7 for the pump 5 into the opposite direction of rotation. The pump 5 draws in oil through non-return valve 45 from the reservoir, and delivers the oil through the duct 35, duct 41 and duct 33 to the right side of the dosing piston 22 which is now in the right-hand position. At the same time, the piston 22 in moving towards the left forces oil through ducts 32 and 20 into the duct 6. The amount delivered by the cylinder 21 into the duct 6 corresponds first to the full suction intake of the pump 5. The valve assembly is therefore open, due to the pressure in the duct 6 being maintained in the valve assembly 11. The cage 1 cannot move at first, because the suction output of the pump is fully covered by the oil issuing from the cylinder 21. Only with the sine-shaped delay from the dosing piston 22, the amount of oil drawn in from the cylinder 4 by the pump increases until the pump draws oil from only the cylinder 4 when the piston 22 reaches its left-hand position. If, during the downward travel a stop order is given, the preliminary control valve 23 is moved to the right, while the sinusoidal drive 26 moves from point A towards point B. According to the sino-shaped progression in the duct 6, the pump receives progressively more oil from the right side of the piston 22, with the suction of oil from the cylinder 4 decreasing correspondingly until the suction side of the pump 5 receives its entire requirements from the cylinder 21, and the cage 1 stops.

Obviously, the dosing piston 22 may also be operated by other means. Also, the actuation of the sinusoidal drive 26 may be effected by a gear brake motor, or by hydraulic means, as shown in FIG. 1a. In this embodiment, there is provided a pump 50 which drives a hydraulic servo motor 51, which motor drives through a rack a pinion 53 firmly connected with the sinusoidal drive 26. The operation may be seen clearly from the drawing.

By adjusting the connecting point 28 on the crank disc 26, the deceleration and acceleration of the hydraulic drive may be adjusted.

It can also be seen that the essential elements of the present invention comprise a dosing, piston and cylinder and a control drive for moving the piston so that oil is taken from or supplied to a connecting duct between the motor and the pump according to a determined function, in order to adjust the supply or withdrawal of oil to and from the motor as desired while the pump is operating at constant speed. The arrangement and construction of the remaining valve controls, such as the preliminary control valve and the reversing valve are secondary and are governed by the application of the control arrangement or hydraulic drive.

This relationship is explained in reference to a further embodiment shown in FIGS. 2 to 7.

In FIG. 2, the motor is a working piston K1 carrying out a high-frequency linear movement and such pistons are used extensively with machine tools. The pistons perform alternating movements which must take place with high frequency, particularly in connection with gear shaping machines. The piston is a double acting projecting piston, and in this case, pump P is a hydrostatic pump, the volumetric output of which may be adjusted by an adjusting mechanism L to meet the requirements. However, any pump with adjustable volumetric output can be used, because the control facilities of the hydrostatic pump through zero are not used in this case, and the pump works always in the same direction. The pump aspirates from tank or reservoir 108 through a duct 101. Pressure duct 102 of the pump leads to a reversing slide valve 110, connecting the duct 102 selectively with two feed lines 103 and 104 of the piston K1.

From the duct 102, a branch duct 102a branches off upstream of the reversing valve 110, and communicates with a change-over slide valve 111. The valve 11 may connect, at choice, the duct 102a with two ducts 103a or 104a, leading to the two ends of a dosing piston K7 operating in a dosing cylinder 112. The piston K7 projects from both ends of the cylinder 112, and is connected on the left side with a sine drive Si1 which is driven at uniform speed in the direction indicated by the arrow. On the right side, the piston K7 is connected directly with the reversing valve 110 so that not only the movement of the piston K7, but also the operation of the reversing valve 110 are controlled by the sinusoidal drive.

Ducts 120a and 120b lead from the reversing valve 110 to the two ends of a dosing piston K8 moving in dosing cylinder 113. The piston K8 also projects from both ends of the cylinder 113 and is connected on the right side with valve 111 and on the left side with a second sinusoidal drive Si2, driven at the same speed and in the same direction as the drive Si1. In addition, the piston K8 has two control channels, forming in the center position of the piston a communication between the two sides of the cylinder 113 and duct 120. These communications are blocked when the piston K8 is in any other position.

The arrangement of the control orifices of the reversing valve 110 is such that one side of the piston K8 is always connected with the corresponding discharge duct of the piston K1. Thus, while the first dosing piston K7 is always associated with a delivery duct, the piston K8 is always connected with the discharge duct of the working piston K1.

In this embodiment, both sinusoidal drives operate always in the same direction, but the two sinusoidal drives are offset by 90° so that the second drive Si2 is in a 90° position when the first drive Si1 passes through zero. The actuation of both sinusoidal drives, mounted preferably on a common shaft, is effected conveniently at uniform angular speed. Furthermore, it is convenient if the pump P with variable volumetric output is used, that the actuation of the sinusoidal drive is so designed that its speed changes in proportion to the volumetric output of the pump P. This may be achieved by suitable means. In the embodiment illustrated, the sinusoidal drives are driven directly by the oil moved by the pump P. This is obvious, because the two dosing pistons K7 and K8, located in the delivery and suction ducts, respectively, and connected to the sinusoidal drives are directly acted on by the oil column moved by the pump P. The movement of the sinusoidal drive is therefore necessarily proportional to the volumetric output of the pump.

In the embodiment, the arrangement is such that during the normal stroke of the piston K1, the valve 111 separates the dosing piston K7 from the branch duct 102a, while the dosing piston K8 is in its center position in which the oil leaving the piston K1 may freely flow through the piston K8 into the duct 120. In order to actuate the sinusoidal drive for initiating a change-over, there is provided a crank drive Aw, connected rigidly with both sinusoidal drives and operated by an initiator piston K6. The piston K6 may assume, in addition to its two end positions, a center position by means of two floating adjusting pistons K4 and K5 located in the cylinder. The center position is the normal position during the working stroke of the piston K1.

In order to supply the piston K6, there is provided an auxiliary pump ZP, for example, a gear pump, drawing oil from the tank 108 through duct 130 and delivering through duct 131 to two parallel preliminary control pistons K2 and K3. The two preliminary control pistons K2 and K3 are normally in their left position under the action of the pressure in the duct 120 maintained at a certain value by a low-pressure control valve GV. To this end, a branch duct 120c leads from the duct 120 to the right side of both preliminary control pistons K2 and K3. Furthermore, the two control pistons are connected by hydraulic linkages 135 and 136 with feeler pistons KT1 and KT2, whose feelers are located in the path of control cams 137 which may be adjusted by the operating piston K1 or a part moved synchronously thereby, in order to initiate changes.

With the preliminary control pistons in their normal left-hand position, oil may freely flow from the duct 131 through the preliminary control cylinder to the outside of the two adjustor pistons K4 and K5 through ducts 106a and 106b. The same flow of oil also actuates both sides of the initiator piston K6. When the displacement of a feeler piston KT causes the displacement of the associated preliminary control piston (K2 or K3), the same connects the associated duct 105 of the initiator cylinder with a reservoir duct, so that this side of the cylinder is depressurized and the initiating crank drive Aw is moved by piston K6 through a small angular range. After a short movement, the piston K6 connects also the other side of the initiator cylinder through a relieving conduit 115 with a reservoir conduit. The effective angular range of the initiating crank drive is sufficient to actuate both dosing pistons K7 and K8 so that the further uniform actuation of the sinusoidal drives is now effected by the oil from the pump P. This movement of the sinusoidal drives also returns the initiator piston K6 at the end of the change-over movement to its center position and the low pressure in the tank conduit 120c returns the preliminary control pistons K2 and K3 to their center position so that the initial condition is again restored.

Naturally, any other arrangement may be used for actuating the sinusoidal drives and initiating the changeover of processes by means of the feeler pistons. The arrangement of the drawing has been shown to be particularly suitable for practical operation, because of its reliable, substantially inertialess response, even with very high frequencies.

The operation of the arrangement of FIG. 2 will now be explained with reference to FIGURES 3 to 7. These figures show merely the essential parts and the associated ducts.

FIG. 3 corresponds to the position of FIG. 2, and in this position, the piston K1 carries out its normal operating stroke downwardly according to the arrow in FIG. 2. The flow of oil is shown by arrows, the double arrows indicating the flow of oil and the single arrows the low pressure flow. It may be seen that oil flows from the duct 102 into the duct 103, leading to the upper end of the piston K1. From the lower end of the piston K1, the depressurized oil is discharged through the duct 104 and the reversing valve 110 into the duct 120b. From this duct, oil flows freely through the preliminary control piston K8 into the duct 120, opening the non-return valve provided in this duct. From the duct 120, the oil returns to the tank 108.

The dosing piston K7 is separated by the valve 111 from the branch delivery duct 102a. The reversing mechanism is not in operation, and the sinusoidal drives are inoperative. When the piston K1 approaches its lower end position, the control cam 137 operates the feeler piston KT2. This causes the right side of the initiator piston K6 to be relieved so that the sinusoidal drives are actuated from the FIGS. 2 and 3 positions in the direction of the arrow. Immediately after the initial rotation, the piston K6 becomes ineffective and the sinusoidal drives are actuated through the dosing pistons K7, K8. The dosing piston K8 breaks immediately the connection between ducts 120b and 120 and simultaneously the change valve 111, connected to the dosing piston K8, opens the connection between the duct 102a and the duct 103a to the right side of the piston K7. At the same time, oil may flow from the right side of the piston K8 through duct 120a and oil from the left side of the piston K7 through duct 104a into the duct 101 of the pump. The direction of flow in the feed ducts of the operating piston remains unchanged.

The dosing piston K7 extracts oil from the delivery duct 102 through the branch duct 102a, according to the constant angular speed of the sinusoidal drive Si1, and first smaller amounts which increase steadily until the drive Si1 reaches its 90° position. In this position, the amount of hydraulic oil taken by the dosing piston K7 from the duct 102 corresponds to the volumetric output of the pump P so that the piston K1 stops, and this position is shown in FIG. 5. Before this position is discussed in detail, the operation of the piston K8 will be explained with reference to FIG. 4.

During the actuation of the sinusoidal drive Si2, the dosing piston K8 is moved at maximum speed to the right and accepts therefore first practically the entire oil flowing from the duct 104. The movement of the piston K8 slows down in accordance with the sine curve so that also the amount of oil discharged by the duct 104 is reduced. This amount is reduced to zero value, when the piston K8 reaches its right-hand end position. This corresponds to the center position of the piston K8, so that the piston K1 comes to standstill in this position, and as already mentioned, this position is shown in FIG. 5. FIG. 5 indicates the instant at which the piston K1 comes to a standstill and the reversing valve 110 carries out the changeover from the duct 103 to the duct 104. This is carried out practically in the absence of pressure, because the ducts 103 and 104 carry no oil flow. The dosing piston K8 has reached its right-hand rest position, whereas the piston K7 moves exactly at maximum speed, whereby oil flows from the duct 102a through the valve 111 to the right side of the piston K7, while from the left side oil is discharged through the duct 104a and the valve 111 into the duct 101.

Immediately after passing through the FIG. 5 position, the switch-over by the valve 110 is terminated, and such is shown in FIG. 6. Oil may now flow from duct 102 through the valve 110 into the duct 104, as indicated by the double arrows. Simultaneously, oil flows from the duct 103 through the valve 110, and the duct 120a to the right side of the dosing piston K8 which moves with rising speed to the left. The piston K8 may now accept according to the sine curve increasing quantities of oil from the duct 103 while the dosing piston K7, which at first takes up the entire oil through the branch duct 102a from the duct 102, now allows an increasing flow of oil into the duct 104, causing the movement of the piston K1 to be accelerated upwardly (FIG. 2). This is continued until the piston K7 reaches its left end position, in which position all oil flows into the duct 104 so that the piston K1 moves at full operating speed in the upward direction. In this position, the control elements which initiated the change-over return to their starting position, the actuation of the sinusoidal drives is stopped and the control process is terminated. The piston K8 resumes its center position in which the discharged oil may flow freely from the duct 103 through the piston K8 into the conduit 120, and this position is shown in FIG. 7. The flow of oil is indicated by double arrows for the oil and by single arrows for the low pressure circuit.

When the piston K1 approaches its upper end position, the control cam 137 operates the upper feeler piston KT1, causing the cycle to be repeated in the opposite direction.

With this new arrangement, the reversing valve 110 serves only for the actual reversal which may be effected instantaneously. The deceleration and acceleration of the working piston is not effected by throttling by means of the reversing valve or another control valve, but merely by controlling the amount of oil flowing from the feed ducts to the working piston. It may be seen that this process is independent of throttling and of the type, operation or speed of the pump.

Naturally, the same object may be produced by means of differential operating pistons, in which the effective piston faces differ. In this case, it is only necessary to design the two dosing pistons K7 and K8 also as differential pistons so that during every forward or return stroke, the pistons are capable of handling the flow of oil from the operating piston.

Merely for the sake of completeness, it should be mentioned that the oil from the pump ZP may also be used to initiate further operations. This is shown in FIG. 2 by a control slide valve 200 which may be operated as a function of the reversing valve, for example, in order to lift the tool holder during the return stroke from the workpiece, or to adjust the tool holder for every working stroke relative to the surface to be machined. These possibilities do not form part of the invention, and need not be described in detail.

The invention is not to be confined to any strict conformity to the showings in the drawings, but changes and modifications may be made therein, so long as such changes or modifications mark no material departure from the spirit and scope of the appended claims.

What we claim is:

1. Means for the smooth deceleration and acceleration of hydraulic drives including a hydraulic motor, a hydraulic pump of constant hydraulic output for supplying hydraulic fluid to the motor, delivery and suction conduit means between the pump and the motor, a valve assembly for controlling the fluid flow between the pump and motor, said valve having a dosing cylinder adapted to communicate with the delivery conduit means between the pump and the motor at least during deceleration and acceleration, a piston displaceable in the cylinder, control means operably associated with the piston for the positive displacement of the piston and operative only during deceleration and acceleration and displacing the piston at a speed changing according to a predetermined curve between zero value and maximum value whereby the volumetric change of the cylinder per unit of time at maximum value is substantially equal to the constant volumetric output of the hydraulic pump.

2. Means for the smooth deceleration and acceleration of hydraulic drives including a hydraulic motor, a hydraulic pump of constant hydraulic output for supplying hydraulic fluid to the motor, delivery and suction conduit means between the pump and the motor, a valve assembly for controlling the fluid flow between the pump and motor, said valve having a dosing cylinder adapted to communicate with the delivery conduit means between the pump and the motor at least during deceleration and acceleration, a piston displaceable in the cylinder, control means operably associated with the piston for the positive displacement of the piston and operative only during deceleration and acceleration and displacing the piston at a speed changing according to a predetermined curve between zero value and maximum value whereby the volumetric change of the cylinder per unit of time at maximum value is substantially equal to the constant volumetric output of the hydraulic pump, and said control means being defined by a sinusoidal drive actuatable at constant speed.

3. The means claimed in claim 2, in which the sinusoidal drive is actuated at a speed proportional to the instantaneous volumetric output of the hydraulic pump.

4. The means as claimed in claim 2, including means for actuating the sinusoidal drive hydraulically.

5. Means for the smooth deceleration and acceleration of hydraulic drives including a hydraulic motor, a hydraulic pump of constant hydraulic output for supplying hydraulic fluid to the motor, delivery and suction conduit means between the pump and the motor, a valve assembly for controlling the fluid flow between the pump and motor, said valve having a dosing cylinder adapted to communicate with the delivery conduit means between the pump and the motor at least during deceleration and acceleration, a piston displaceable in the cylinder, control means operably associated with the piston for the positive displacement of the piston and operative only during deceleration and acceleration and displacing the piston at a speed changing according to a predetermined curve between zero value and maximum value whereby the volumetric change of the cylinder per unit of time at maximum value is substantially equal to the constant volumetric output of the hydraulic pump, said hydraulic motor including a plunger for use with a hydraulic lift, said plunger having an operative face, and valve means for connecting said operative face selectively to the delivery or to the suction side of the pump, so that during the deceleration and acceleration the fluid cylinder removes fluid from the delivery conduit means when the plunger is connected to the delivery side of the pump and feeds fluid into the suction conduit means when the plunger is connected to the suction side of the pump.

6. The means as claimed in claim 5, in which the control means is a sinusoidal drive actuatable at constant speed and being operable in both directions and rotatable only through an angle of 90°, so that when the hydraulic drive after deceleration is stopped, the sinusoidal drive is in the position corresponding to the maximum volumetric change of the dosing cylinder, and in normal operation of the hydraulic drive in the position in which the volumetric change is equal to zero.

7. The means as claimed in claim 6, in which the valve means includes a preliminary control slide actuable according to the direction of rotation of the sinusoidal drive and together therewith for connecting both sides of the piston in a predetermined manner with the connections between the plunger and pump with a conduit leading to a tank or with the side of the pump not connected to the plunger.

8. The means as claimed in claim 7, comprising feeler components projecting in the path of the plunger for actuating the sinusoidal drive and adjusting the preliminary control slide into the deceleration position.

9. The means as claimed in claim 8, including cam means associated with the plunger for actuating the feeler components.

10. Means for the smooth deceleration and acceleration of a hydraulic drive, particularly for high-frequency alternating movements including a motor actuatable by hydraulic fluid in both directions, a continuously working hydraulic pump with constant rotation, delivery and suction conduit means between the motor and pump, a dosing cylinder and piston, a reversing valve located between the motor and pump for connecting the delivery conduit means to the motor alternately to the delivery side of the pump, the dosing piston being connected to the delivery conduit means of the pump upstream of the reversing valve, control means operably associated with the piston for displacing the piston at a speed changing according to a predetermined curve between zero value and maximum valve whereby the volumetric change of the cylinder at maximum value per unit of time is substantially equal to the constant volumetric output of the pump and the operation of the reversing valve being effected automatically substantially at the moment at which the volumetric change velocity of the dosing cylinder reaches its minimum value.

11. The means as claimed in claim 10, in which the reversing valve is controlled by a sinusoidal drive.

12. The means as claimed in claim 11, in which the reversing valve defines a slide forming a unit with the dosing piston and moving therewith in a common cylinder.

13. The means as claimed in claim 12, comprising a valve slide controlled by the sinusoidal drive, closing normally both sides of the dosing piston both from the conduit means to the delivery side and from the conduit means to the suction side of the pump, and opening these connections only during every alternation.

14. The means as claimed in claim 13, comprising a second dosing cylinder having a double-acting dosing piston, said piston capable of being actuated at the same speed as the sinusoidal drive of the first dosing piston by a second sinusoidal drive, and located in the path of the hydraulic fluid flowing from the inoperative side of the cylinder downstream of the reversing valve in such way that the discharged fluid normally flows freely through the dosing cylinder and that at the beginning of the reversing movement, the dosing piston closes the discharge, causing the depressurized fluid coming from the motor to be metered off by means of the sinusoidal drive with a volumetric output ranging from maximum value to zero value and back to maximum value.

15. The means as claimed in claim 14, in which the second sinusoidal drive is fastly connected with the first sinusoidal drive, but offset relative thereto by 90°.

16. The means as claimed in claim 15, in which the reversing valve serves also as a preliminary control valve for controlling the flow of the discharged fluid to one of the two sides of the second dosing piston.

17. The means as claimed in claim 16, including a starting means for starting the sinusoidal drives, said means acting on a crank drive firmly connected thereto, and operable by a triggering means for the reversing movement controlled by the alternating movement.

18. The means as claimed in claim 17, in which the starting means includes a hydraulic piston in a cylinder held by means of an auxiliary hydraulic source with constant pressure and by means of two floating adjusting pistons in the starting cylinder in a center position in which the sinusoidal drives are at rest and in which two feeler components of the starting means are always associated with one preliminary control slide each of which normally closes the discharge of fluid from the starting cylinder and opens this discharge only in response of one feeler component.

19. The means as claimed in claim 18, in which after the response of the starting means both sides of the starting piston are immediately relieved.

20. The means as claimed in claim 19, in which the preliminary control slide communicates with the associated feeler components through a hydraulic linkage.

References Cited in the file of this patent

UNITED STATES PATENTS

| | | |
|---|---|---|
| 1,165,653 | Dunn | Dec. 28, 1915 |
| 2,005,018 | West et al. | June 18, 1935 |
| 2,764,999 | Stanbury | Oct. 2, 1956 |
| 2,928,244 | Klopp | Mar. 15, 1960 |